United States Patent Office 3,787,579
Patented Jan. 22, 1974

3,787,579
MALONONITRILE OXIME DERIVATIVES AS
FUNGICIDAL AGENTS
John E. Engelhart, Westfield, N.J., assignor to
Esso Research and Engineering Company
No Drawing. Original application Apr. 15, 1970, Ser. No.
28,982, now Patent No. 3,694,482. Divided and this
application June 15, 1972, Ser. No. 263,034
Int. Cl. A01n 9/12, 9/24
U.S. Cl. 424—301                                        1 Claim

ABSTRACT OF THE DISCLOSURE

Deriatives of malononitrile oxime characterized by the following structural formula:

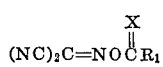

wherein X can be oxygen or sulfur; $R_1$ is taken from the group consisting of $OR_2$, $SR_3$, $NR_4R_5$ and $C_1-C_{10}$ alkyl, $C_2-C_{10}$ alkenyl, $C_2-C_{10}$ alkynyl or $C_3-C_{10}$ cycloalkyl; $R_2$, $R_3$, $R_4$ and $R_5$ can be hydrogen or $C_1-C_{10}$ alkyl, $C_2-C_{10}$ alkynyl or $C_3-C_{10}$ cycloalkynyl or $C_3-C_{10}$ cycloalkyl. The above-mentioned $C_1-C_{10}$ alkyl, $C_2-C_{10}$ alkenyl, $C_2-C_{10}$ alkynyl and $C_3-C_{10}$ cycloalkyl in $R_1$, $R_2$, $R_3$, $R_4$ and $R_5$ may be unsubstituted or substituted by halogen, nitrile, nitro, thiocyano, perhaloalkyl, $C_1-C_4$ alkoxy and $C_1-C_4$ thioalkyl.

---

This is a division of application Ser. No. 28,982 filed April 15, 1970, now U.S. Pat. No. 3,694,482.

This invention relates to derivatives of malononitrile oxime. In another aspect, this invention relates to the use of malononitrile derivatives as soil fungicides.

The derivatives of malononitrile oxime can be characterized in the following structure:

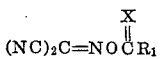

wherein X can be oxygen or sulfur; $R_1$ is taken from the group consisting of $OR_2$, $SR_3$, $NR_4R_5$ and $C_1-C_{10}$ alkyl, $C_2-C_{10}$ alkenyl, $C_2-C_{10}$ alkynyl or $C_3-C_{10}$ cycloalkyl; $R_2$, $R_3$, $R_4$ and $R_5$ can be hydrogen or $C_1-C_{10}$ alkyl, $C_2-C_{10}$ alkenyl, $C_2-C_{10}$ alkynyl or $C_3-C_{10}$ cycloalkyl. The above-mentioned $C_1-C_{10}$ alkyl, $C_2-C_{10}$ alkenyl, $C_2-C_{10}$ alkynyl and $C_3-C_{10}$ cycloalkyl in $R_1$, $R_2$, $R_3$, $R_4$ and $R_5$ may be unsubstituted or substituted by halogen, nitrile, nitro, thiocyano, perhaloalkyl, $C_1-C_4$ alkoxy and $C_1-C_4$ thioalkyl.

Specific examples of these compounds are as follows:

Compound No.:
1. S-ethyl oximinomalononitrilo thiolcarbonate
2. S-methyl oximinomalononitrilo thiolcarbonate
3. Methyl oximinomalononitrilo carbonate
4. Heptyl oximinomalononitrilo carbonate
5. O-(dimethylcarbamoyl)malononitrile oxime
6. O-(methylcarbamoyl)malononitrile oxime
7. O-acetyl malononitrile oxime
8. O-propionyl malononitrile oxime
9. O-(dimethylthiocarbamoyl)malononitrile oxime
10. S-ethyl oximinomalononitrilo dithiocarbonate
11. Methyl oximinomalononitrilo thionocarbonate
12. S-(2-chloroethyl)-oximinomalononitrilo thiolcarbonate
13. S-(2-methylthioethyl)-oximinomalononitrilo thiolcarbonate
14. S-(2-thiocyanatoethyl)-oximinomalononitrilo thiolcarbonate
15. S-(2-chloropropyl)-oximinomalononitrile thiolcarbonate
16. 2-bromoethyl oximinomalononitrilo carbonate
17. 2-methylthioethyl oximinomalononitrilo carbonate
18. 2-thiocyanatopropyl oximinomalononitrilo carbonate
19. O-(N-methyl-N-methoxycarbamoyl)malononitrile oxime
20. O-(N-butyl-N-methylcarbamotyl)malononitrile oxime
21. O-(N-methyl-N-2-cyanoethylcarbamoyl)malononitrile oxime
22. O-(N-methyl-N-2-methoxyethylcarbamoyl) malononitrile oxime
23. 2-propenyl oximinomalononitrilo carbonate
24. 3-butynyl oximinomalononitrilo carbonate
25. S-(3-propenyl)-oximinomalononitrilo thiolcarbonate
26. 2-chloroethyl oximinomalononitrilo thionocarbonate
27. 2-methylthiopropyl oximinomalononitrilo thionocarbonate
28. S-(2-chloroethyl)-oximinomalononitrilo dithiocarbonate
29. S-(2-thiocyanatoethyl)-oximinomalononitrilo dithiocarbonate
30. O-(N-methyl-N-butyl-thiocarbamoyl)malononitrile oxime
31. O-(N-methyl-N-2-cyanoethylthiocarbamoyl) malononitrile oxime
32. O-(N-methyl-N-2-propenylthiocarbamoyl)malononitrile oxime
33. O-(dipropylthiocarbamoyl)malonitrile oxime
34. O-(2-methoxypropionyl)malononitrile oxime
35. O-(2-nitropropionyl)malononitrile oxime
36. O-decanoyl malononitrile oxime
37. O-(3-chlorobutyryl)malononitrile oxime
38. O-(thiopropionyl)malonitrile oxime
39. O-(3-methoxythiobutyryl)malononitrile oxime
40. O-(3-butenoylthio)malononitrile oxime
41. O-(4-hexenoyl)malononitrile oxime
42. O-(3-pentynoyl)malononitrile oxime
43. O-carbamoyl malononitrile oxime
44. O-thiocarbamoyl malononitrile oxime These compounds enumerated hereinabove can be prepared by the following process which is represented schematically as follows:

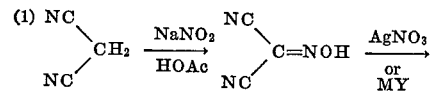

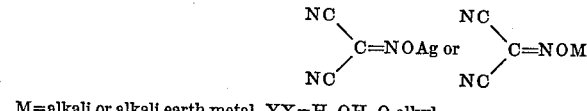

M=alkali or alkali earth metal, YX=H, OH, O-alkyl.

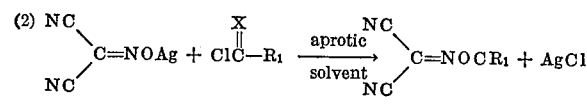

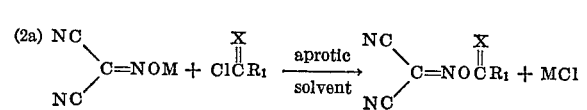

REACTION CONDITIONS FOR CARRYING OUT THE REACTIONS STATED HEREINBEFORE

| Step | Reactant 1 | Reactant 2 | Preferred mole ratio 1/2 | Solvents | Temp. range | Pressure |
|---|---|---|---|---|---|---|
| 1 | Malononitrile | Sodium nitrite acetic acid | 1:1 to 1:10 | H₂O, dilute acids | −20° to +50° C | Atmospheric |
| 1a | | Silver nitrate alkali metal hydroxides | 1:1 to 1:3 | Dilute mineral acids | −20° to +50° C | Do. |
| 2 | Silver salt of malononitrile oxime. | Ethylchloroformate; dimethyl carbamoyl chloride; ethylchlorothiolformate; dimethyl thiocarbamoyl chloride acetyl chloride. | 5:1 to 1:1 | Benzene, xylene, other aprotic solvents. | −20° to +100° C | Atmospheric. |
| 2a | Potassium salt of malononitrile oxime. | | | | | Do. |

The compounds of the invention have general fungicidal properties. They are especially useful in certain types of fungi control such as, for example, in application to crop lands to give control of a wide variety of soil pathogens without harming the crop plants.

Fungicidal compositions of the invention are prepared by admixing one or more of the active ingredients defined heretofore, in fungicidally effective amounts with a conditioning agent of the kind used and referred to in the art as a pest control adjuvant or modifier to provide formulations adapted for ready and efficient application to soil using conventional applicator equipment.

Thus, the fungicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cyclic ketones, relatively high up to about 50% by weight or more concentration of the active ingredient can be obtained in solution.

The fungicidal compositions of the invention whether in the form of dusts of liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, laurylpyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The fungicidal compositions are applied either as a spray, granular or a dust to the locus or area to be protected from soil pathogen infestation. Such application can be made directly upon the locus or area and during the period of pathogen (fungus) infestation in order to destroy the fungi, but preferably, the application is made in advance of an anticipated fungal infestation to prevent such infestation. The compositions can be applied as sprays directly on the soil surface or alternatively, the dry powdered compositions can be dusted directly on the soil. In addition, the fungicidal compositions can be utilized as seed treatment agents whereby the crop seed is treated with an effective concentration of the fungicidal composition prior to application of the crop seed in the soil.

In applying the fungicidal compositions of the invention for fungal control as in the control of soil fungi in cotton or corn fields, the compositions are preferably applied before planting of the crop seeds or together with the crop seeds.

The active compound is, of course, applied in an amount sufficient to exert the desired fungicidal action. The amount of the active compound present in the compositions as actually applied for destroying or preventing soil fungi infestations will vary with the manner of application, the particular fungi for which control is sought, the purpose for which the application is being made, and like variables. In general, the fungicidal compositions as applied in the form of a spray, dust or granular, will contain from about 0.1% to 100% by weight of the active compound.

Fertilizer materials, other fungicidal agents, and other pest control agents such as insecticides and herbicides, can be included in the fungicidal compositions of the invention if desired.

The term "carrier" or diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals, although subsequently subjected to grinding, sieving, purification, and/or other treatments, including for example, gypsum, tripolite, diatomaceous earth, mineral silicates such as mica, vermiculite, talc, and pyrophyllite, clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives.

For some purposes, a resinous or waxy carrier can be used, preferably one which is solvent soluble or thermoplastic, including fusible materials. Examples of such carriers are natural or synthetic resins such as a coumarone resin, rosin, copal, shellac, dammar, polyvinyl chloride, styrene polymers and copolymes, a solid grade of polychlorophenol, such as is available under the registered trademark "Aroclor," a bitumen, as asphaltite, a wax for example, beeswax or a mineral wax such as parffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely devided solid carrier and/or a wetting agent. The active ingredient can be in particulate form or adsorbed on the carrier and preferably constitutes at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers; hydrocarbons; etc.

Where the toxicant itself is a liquid these materials can be sprayed on crops or insects without further dilution. Petroleum hydrocarbon fractions used as solvents should preferably have a flash point about 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. The concentrates can also contain a proportion of water, for example, up to about 50% by volume, based on the total composition, to facilitate subsequent dilution with water. Suitable organic liquids include, e.g., the above petroleum hydrocarbon fractions previously described.

The emulsifying agent can be of the type producing water-in-oil type emulsions which are suitable for application by low volume spraying, or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test fungi used, etc. by which the compounds and/or compositions described and claimed are prepared and/or used.

EXAMPLE 1

Preparation of malononitrile oxime derivatives

To a solution of 0.1 mole of an acyl halide in 120 ml. benzene, 0.1 mole of the silver salt of malononitrile oxime was added in small portions. The resulting suspension was allowed to stir for 48 hours at ambient temperature followed by filtration of the insoluble silver halide. The benzene filtrate was then evaporated on a rotary concentrator and the crude product recrystallized or distilled under vacuum. Table I summarizes the properties of a number of compounds of this invention prepared by the above method.

EXAMPLE 2

Preparation of O-(methylcarbamoyl)malononitrile oxime

Malononitrile oxime was generated from the silver salt by the method of Longo [G. Longo, Gazz. Chim. Ital. 61, 575 (1931)]. To 4.7 g. (0.05 mole) of the oxime dissolved in 50 ml. ether containing a few drops of dibutyl tin diacetate was added dropwise 4.2 g. of methyl isocyanate. The temperature rose from 25 to 32° and the solution was allowed to stir overnight. A small amount of yellow solid which precipitated was filtered and discarded. The filtrate was then evaporated on a rotary concentrator to yield 4.0 g. of crude product, M.P. 45–50°.

EXAMPLE 3

Soil fungicide properties of malononitrile oxime derivatives

In this example, representative derivatives of the malononitrile oxime compounds of this invention were evaluated for fungicidal activity. The test procedure was as follows:

Separate lots of sterilized soil are inoculated with the soil pathogens, Pythium, Rhizoctonia, Sclerotium and Fusarium. The inoculated soil is placed in 4 oz. dixie cups and drenched with 20 ml. of a formulation containing sufficient chemical to give a dose rate of 100 lb./acre or 50 p.p.m. in the soil. The treated cups are incubated for 2 days at 70° F. The amount of mycelial growth on the soil surface is then rated on a scale of 0–10, where 0=no control and 10=complete control of mycelial growth. Table II illustrates the activity of several compounds of this invention.

What is claimed is:

1. A method for controlling soil fungi comprising treating soil contaminated with said fungi with a fungicidal composition comprising a fungicidally effective amount

TABLE I.—PROPERTIES OF MALONONITRILE OXIME DERIVATIVES $$\begin{array}{c} NC \\ \phantom{NC} \diagdown \\ \phantom{NCNC} C=NO\overset{X}{\underset{\|}{C}}-R \\ \phantom{N} \diagup \\ NC \end{array}$$

| Compound | Percent yield | B.P. (M.P.) | Calculated C | Calculated H | Calculated N | Found C | Found H | Found N | NMR signals, p.p.m. |
|---|---|---|---|---|---|---|---|---|---|
| S-ethyloximino malononitrilo thiolcarbonate | 59 | 61–62°/0.15 mm. | 39.3 | 2.73 | 23.0 | 39.2 | 2.74 | 23.6 | 1.4t J=7 c.p.s.; 2.7q J=7 c.p.s. |
| Methyl oximinomalononitrilo carbonate | 92 | (47–48.5°) | 39.2 | 1.96 | 27.4 | 39.0 | 2.13 | 27.2 | 4.1s |
| O-(dimethylcarbamoyl)malononitrile oxime | 54 | 82°/0.3 mm. (75–75.5°) | 43.4 | 3.62 | 33.7 | 43.6 | 3.76 | 33.8 | 3.1s |
| O-(methylcarbamoyl)malononitrile oxime | 53 | (43–50°) |  |  | 36.8 |  |  | 36.8 | 2.8d J=11 c.p.s.; 2.4s |
| O-acetyl malononitrile oxime | 68 | 58–60°/0.5 mm. | 43.8 | 2.18 | 30.6 | 43.4 | 2.24 | 30.7 |  |
| O-propionyl malononitrile oxime | 79 | 58°/0.05 mm. | 47.6 | 3.31 | 27.8 | 47.2 | 3.27 | 27.4 | 1.25t J=7 c.p.s.; 2.7q J=7 c.p.s. |
| O-(dimethylthiocarbamoyl)malononitrile oxime | 82 | (87–88° dec.) | 39.6 | 3.32 | 30.8 | 39.3 | 3.57 | 31.1 | 3.1s |

TABLE II.—SOIL FUNGICIDAL ACTIVITY OF MALONONTRILE OXIME DERIVATIVES

| Compound | Rate, lb./acre | Fusarium | Pythium | Rhizoctonia | Sclerotium |
|---|---|---|---|---|---|
| S-ethyloximinomalononitrilo thiolcarbonate | 100 | 10 | 10 | 10 | 10 |
|  | 50 | 10 | 10 | 9 | 10 |
| O-(dimethylcarbamoyl)malononitrile oxime | 100 | 10 | 10 | 10 | 10 |
|  | 50 | 9 | 10 | 10 | 10 |
| O-(dimethylthiocarbamoyl)malononitrile oxime | 100 | 10 | 10 | 10 | 10 |
|  | 50 | 10 | 10 | 8 | 9 | of S-ethyl-oximinomalononitrilo thiocarbonate and an inert carrier.

References Cited

UNITED STATES PATENTS

| | | | |
|---|---|---|---|
| 3,234,255 | 2/1966 | Hackmann et al. | 71—121 |
| 3,483,231 | 12/1969 | Marcus et al. | 260—465.4 |
| 3,488,377 | 1/1970 | Krenzer et al. | 424—301 |
| 2,749,358 | 6/1956 | Reilly | 260—465.4 |
| 3,377,372 | 4/1968 | Berezin et al. | 424—301 |
| 3,172,900 | 3/1965 | Berezin et al. | 260—455 B |

FOREIGN PATENTS

| | | | |
|---|---|---|---|
| 1,550,805 | 11/1968 | France | 260—566 AE |

OTHER REFERENCES

"Carboxy Methoxylamine Hemihydrochloride," Org. Syn. 27, pp. 15–17 (1947).

JEROME D. GOLDBERG, Primary Examiner

U.S. Cl. X.R.

424—302, 304